(12) United States Patent
Clingerman et al.

(10) Patent No.: US 7,336,941 B1
(45) Date of Patent: Feb. 26, 2008

(54) SYSTEM AND METHOD FOR UNIFIED ACCOUNTING FOR WIRELESS COMMUNICATION NETWORKS

(75) Inventors: Stephen K. Clingerman, McKinney, TX (US); Prasanna J. Satarasinghe, McKinney, TX (US); Yoon Hee Kim, Coppell, TX (US); David Ka-Wai Hui, Fremont, CA (US); Harpal Singh Narula, Carrollton, TX (US); Abid Inam, Grapevine, TX (US)

(73) Assignee: Intel Corporation, Santa Clara, CA (US)

( * ) Notice: Subject to any disclaimer, the term of this patent is extended or adjusted under 35 U.S.C. 154(b) by 927 days.

(21) Appl. No.: 10/411,831

(22) Filed: Apr. 11, 2003

Related U.S. Application Data (60) Provisional application No. 60/430,510, filed on Dec. 2, 2002.

(51) Int. Cl.
*H04M 11/04* (2006.01)
*H04M 11/00* (2006.01)

(52) U.S. Cl. ............... 455/404.1; 455/404.2; 455/405; 455/406

(58) Field of Classification Search ......... 370/353, 370/229, 328, 351, 335, 392, 338, 389; 455/411, 455/410, 414.1, 435.1, 433, 552.1, 561, 404.1, 455/404.2, 405, 406
See application file for complete search history.

(56) References Cited

U.S. PATENT DOCUMENTS

| | | | |
|---|---|---|---|
| 5,483,575 A * | 1/1996 | Zdanowski et al. | 455/508 |
| 6,608,832 B2 * | 8/2003 | Forslow | 370/353 |
| 6,795,701 B1 * | 9/2004 | Hui et al. | 455/411 |
| 2003/0050041 A1 * | 3/2003 | Wu | 455/406 |

* cited by examiner

*Primary Examiner*—William Trost
*Assistant Examiner*—Julio Perez
(74) *Attorney, Agent, or Firm*—James S. Finn (57) ABSTRACT

The present disclosure provides a system and method for providing unified accounting for a network including GSM, WAIN and WLAN components.

19 Claims, 5 Drawing Sheets

SYSTEM AND METHOD FOR UNIFIED ACCOUNTING FOR WIRELESS COMMUNICATION NETWORKS

RELATED APPLICATION

This application claims benefit of U.S. Provisional Application No. 60/430,510, filed Dec. 2, 2002. Furthermore, this application relates to U.S. application Ser. No. 09/851,681, filed on May 8, 2001, which is commonly assigned and incorporated herein by reference in its entirety.

BACKGROUND OF THE INVENTION

The present invention relates generally to a communications system and, more particularly, to a method and apparatus for unified accounting across wireless communication network.

There exists several different accounting methods that users may utilize to access a wireless communications networks However, no efficient method or system exists that provides unified accounting for a variety of accounting methods.

Therefore, what is needed, is a system and method that provides unified accounting for more than one accounting method utilized for more than one access method.

SUMMARY OF THE INVENTION

The present disclosure provides a system and method that provide unified accounting across wireless communication networks.

Therefore, in accordance with the previous summary, objects, features and advantages of the present disclosure will become apparent to one skilled in the art from the subsequent description and the appended claims taken in conjunction with the accompanying drawings.

DETAILED DESCRIPTION OF THE PREFERRED EMBODIMENTS

The present disclosure can be described by the embodiments given below. It is understood, however, that the embodiments below are not necessarily limitations to the present disclosure, but are used to describe a typical implementation of the invention. In addition, details of a Wireless Access Integrated Node (WAIN) server and architecture can be found in the patent application Ser. No. 09/851,681, incorporated by reference above.

There are currently two different accounting standards supported by wireless data service providers. The General Packet Radio Service (GPRS) operators comply with European Telecommunications Standard Institute (ETSI) standards while the Wireless Internet Service Provider (WISP) operators comply with Internet Engineering Task Force (IETF) standards.

However, these two standards differ from each other. Some Wireless Local Area Network (WLAN) users may not have a GPRS subscription associated with an International Mobile Subscriber Identity (IMSI) within a Security Identity Module (SIM) card. Thus, those WLAN users utilize the IETF accounting standards. Therefore, it is desirable if those users could use the same GPRS charging and billing system as specified by ETSI standards.

ETSI accounting complies with Global System for Mobile Communication (GSM) specification 12.15 which utilize Call Data Records (CDRs). These CDRs are generated upon reaching certain trigger conditions specified by the GSM 12.15. Moreover, the IMSI is a user identifier that links the CDR to a particular user. Two types of CDRs are generated, an S-CDR and a G-CDR. The CDR contents are shown in Table 1.

TABLE 1

GPRS CDR Format

| Field | Presence M = Mandatory C = Conditional O = Optional | Description |
| --- | --- | --- |
| Record Type | M (S-CDR/ G-CDR) | The field identifies the type of the record e.g. S-CDR, G-CDR, M-CDR, S-SMO-CDR and S-SMT-CDR. |
| Network Initiated PDP Context | C (S-CDR/ G-CDR) | This field indicates that Packet Data Protocol (PDP) context is network initiated. The field is missing in case of mobile activated PDP context. |
| Anonymous Access Indicator | C (S-CDR/ G-CDR) | Set to true to indicate anonymous access (and that the Served IMSI is not supplied) |
| Served IMSI | M (S-CDR/ G-CDR) | This fields contains the international mobile subscriber identity (IMSI) of the served party. The Client "served" party is used to describe the mobile subscriber involved in the transaction recorded (e.g. the calling subscriber in case of a mobile initiated PDP context.) The structure of the IMSI is defined in GSM 03.03. |
| Served IMEI | C (S-CDR/ G-CDR) | This field contains the international mobile equipment identity (IMEI) of the equipment served. The Client "served" equipment is used to describe the ME involved in the transaction recorded (e.g. the called ME in the case of a network initiated PDP context.) The structure of the IMEI is defined in GSM 03.03. |
| Serving GPRS Serving Node (SGSN) Address | M (S-CDR/ G-CDR) | The S-CDR fields contain the single address of current SGSN and GGSN used. |
| Gateway GPRS Support Node (GGSN) Address | M (S-CDR/ G-CDR) | The IP address of the GGSN used. |
| MS Network Capability | | This MS Network Capability field contains the MS network capability value of the MS network capability information element of the served MS on PDP context activation or on GPRS attachment as defined in GSM 04.08. |
| Routing Area | | Routing Area at the time of the record creation. |
| Local Area Code | | Location area code at the time of the record creation. |

TABLE 1-continued

GPRS CDR Format

| Field | Presence M = Mandatory C = Conditional O = Optional | Description |
|---|---|---|
| Cell Identity Charging ID | M (S-CDR/ G-CDR) | Cell ID at the time of the record creation. This field is a charging identifier which can be used together with the GGSN address to identify all records produced in SGSN(s) and GGSN involved in a single PDP context. Charging ID is generated by the GGSN at PDP context activation and transferred to the context requesting SGSN. At inter-SGSN routing area update, charging ID is transferred to the new SGSN as part of each active PDP context. Different GGSNs allocate the charging ID independently of each other and may allocate the same numbers. The Charging Gateway Facility (CGF) and/or BS may check the uniqueness of each charging ID together with the GGSN address and optionally (if still unambiguous) with the record opening time stamp. The GGSN function in the WS generates an integer in the range of 0..4294967295 unique to itself for every CDR issued. |
| GGSN Address Used | M (S-CDR) | The IP address of the GGSN currently used. The GGSN address is always the same for an activated PDP. |
| Access Point NameNI | M (S-CDR/ G-CDR) | This field contains the logical Access Point Name (APN) used to determine the actual connected access point. The APN is comprised of a mandatory network identifier and an optional operator identifier (this field is the network identifier). The APN can also be a wildcard, in which case the SGSN selects the access point address. See GSM 09.60 and GSM 03.60 for more information about APN format and access point decision rules. The APN is information from the MS or SGSN, that may be used by the GGSN to differentiate between accesses to different external packet data networks using the same PDP Type. |
| APN Selection Mode | O (S-CDR/ G-CDR) | This field indicates how the SGSN selected the APN to be used. The values and their meaning are as specified in GSM 09.60 clause 7.9 'Information elements'. |
| PDP Type | M (S-CDR/ G-CDR) | This field defines the PDP type (e.g. X.25, IP, PPP, or IHOSS:OSP) (see GSM 09.60 for exact format). |
| Served PDP Address | M (S-CDR/ G-CDR) | This field contains the PDP address of the served IMSI. This is a network layer address (e.g. of type IP version 4, IP version 6 or X.121). The address for each PDP type is allocated either temporarily or permanently (see field "Dynamic Address Flag"). |
| Remote PDP Address | O (G-CDR) | Remote PDP address may be used if PDP type is X.25. This parameter is not used if the PDP type is IP, PPP, or IHOSS:OSP. Itemized volume billing is available per APN. This field contains a list of connected remote PDP addresses. |
| Dynamic Address Flag | C (G-CDR) | This field indicates that PDP address has been dynamically allocated for that particular PDP context. Field is missing if address is static (e.g. part of PDP context subscription). Dynamic address allocation might be relevant for charging (e.g. the duration of PDP context as one resource offered and possible owned by network operator). |
| List of Traffic Data Volumes | M (S-CDR/ G-CDR) | This list includes one or more containers, which each include the following fields: Data Volume Uplink, Data Volume Downlink, Change Condition and Time Stamp. Data Volume includes the number of octets transmitted during the use of packet data services. Change condition defines the reason for closing the container (see 5.7.1 and 5.7.3), such as tariff time change, Quality of Service (QoS) change or closing the CDR. Change time is a time stamp which defines the moment when the new volume counts are started or the CDR is closed. All the active PDP contexts do not need to have exactly the same time stamp (e.g. due to same tariff time change variance of the time stamps is implementation and traffic load dependent and is out of the scope of standardization). The first container can include the following optional fields: QoS Requested (not in G-CDR) and QoS Negotiated. In the containers that follow, QoS Negotiated is present if previous change condition is QoS change. For more information, see 12.15 page 28. |
| Record Opening Time | M (S-CDR/ G-CDR) | This field contains the time stamp of when the record is opened (see GSM 12.05 for exact format). Record opening reason does not have a separate field. For G-CDR and M-CDR, it can be derived from the field "Sequence number" i.e. missing field or value one means activation of PDP context and GPRS attachment. For the S-CDR, the field "SGSN change" also needs to be taken into account. |
| Duration | M (S-CDR/ G-CDR) | This field contains the relevant duration in seconds for PDP contexts (S-CDR, G-CDR, and attachment (M-CDR)). For partial records, this is the duration of the individual partial record and not the cumulative duration. It should be noted that the internal time measurements may be expressed in terms of tenths of seconds or even milliseconds and, as a result, the calculation of the duration may result in the rounding or truncation of the measured duration to a whole number of seconds. Whether or not rounding or truncation is to be used is considered to be outside the scope of this Specification subject to the following restrictions: A duration of zero seconds shall be accepted providing that the transferred data volume is greater than zero. The same method of truncation/rounding shall be applied to both single and partial records. |
| SGSN Change | C (S-CDR) | This field is present only in the S-CDR to indicate that this is the first record after an inter-SGSN routing area update. |
| Cause for Record Closing | M (S-CDR/ G-CDR) | This field contains a reason for the release of the CDR including the following: normal release - PDP context release or GPRS detach; partial record generation - data volume limit, time (duration) limit, SGSN change of maximum number of changes in charging conditions; abnormal termination (PDP or MM context); and management intervention (request due to O&M reasons). A more detailed reason may be found in the diagnostics field. |
| Diagnostics | O (S-CDR/ G-CDR) | This field includes a more detailed technical reason for the release of the connection and may contain one of the following: a MAP error from GSM 09.02; or a Cause from GSM 04.08. The diagnostics may also be extended to include manufacturer and network specific information. 098i/8h. |
| Record Sequence Number | C (S-CDR/ G-CDR) | This field contains a running sequence number employed to link the partial records generated in the SGSN/GGSN for a particular PDP context (characterized with same the Charging ID and |

TABLE 1-continued

GPRS CDR Format

| Field | Presence<br>M = Mandatory<br>C = Conditional<br>O = Optional | Description |
|---|---|---|
| | | GGSN address pair). In the S-CDR, the sequence number is always started from one after inter-SGSN routing area update (see field "SGSN change"). The Record Sequence Number is missing if the record is the only one produced in the SGSN/GGSN for the PDP context (e.g. inter-SGSN routing area update can result to two S-CDRs without sequence number and field "SGSN update" present in the second record). |
| Node ID | O<br>(S-CDR/<br>G-CDR) | This field contains an optional operator configurable identifier string for the node which generated the CDR. |
| Record Extensions | O<br>(S-CDR/<br>G-CDR) | The field enables network operators and/or manufacturers to add their own extensions to the standard record definitions. This field contains a set of "management extensions" as defined in CCITT X.721. |
| Local Record Sequence Number | O<br>(S-CDR/<br>G-CDR) | This field includes a unique record number created by this node. The number is allocated sequentially including all CDR types. The number is unique within one node, which is identified either by field Node ID or by record dependent node address (SGSN address, GGSN address, Recording Entity). The field can be used to identify missing records in post processing system. |
| Access Point Name OI | M<br>(S-CDR) | This field contains the logical APN used to determine the actual connected access point. The APN is comprised of a mandatory network identifier and an optional operator identifier (this field is the operator identifier). APN can also be a wildcard, in which case SGSN selects the access point address. (see GSM 09.60 and GSM 03.60 for more information about APN format and access point decision rules.) The APN is information from the MS or SGSN, that may be used by the GGSN to differentiate between accesses to different external packet data networks using the same PDP Type. |

On the other hand, the accounting standard specified by the IETF is a Remote Authentication Dial-In User Server/Service (RADIUS) accounting standard defined by Request for Comment (RFC) 2866. RADIUS accounting records, like the CDR counterparts, are generated upon reaching certain triggers. In addition, a field named "User-Name" is an user identifier that links the RADIUS accounting record to a particular user. Listed below is a table with the RADIUS attributes.

TABLE 2

RADIUS Accounting Record

| RADIUS Element | Description |
|---|---|
| NAS-IP-Address | This attribute indicates the identifying IP address of the server which is requesting authentication of the user. This attribute must be present if NAS-Identifier is not present. This attribute is configurable at the WAIN server. |
| NAS-Port-Type | This attribute indicates the type of the physical port of the NAS which is authenticating the user. It is only used in Access-Request packets. The value of the NAS-Port-Type is 19 to represent 802.11. |
| User-Name | This attribute indicates the name of the user to be authenticated. This is the user credential collected from the web login page. |
| Framed-IP-Address | This attribute indicates the IP address assigned to the user. |
| Acct-Session-ID | This attribute is a unique Accounting ID to make it easy to match start and stop records in a log file. The start, stop, and interim records for a given session have the same Acct-Session-Id. An Accounting-Request message has an Acct-Session-Id. This attribute is generated by the WAIN server when it sends Accounting Request (Acct-Status-Type=Start) message. |
| Acct-Status-Type | This attribute indicates whether this Accounting Request marks the beginning of the user service (Start), interim (Interim), or the end (Stop). The WAIN server supports the following values: Start; Stop; and Interim. |
| Acct-Terminate-Cause | This attribute indicates how the session was terminated, and can only be present in Accounting-Request records where the Acct-Status-Type is set to Stop. The WAIN server supports the following values: Session Timeout (5); User Request (1); Lost Service (3); Lost Carrier (2); and NAS Reboot (11). 'Session Timeout' indicates that the expiry of Session-Timeout values received in Accounting Request (Acct-Status-Type=Stop). 'User Request' indicates the user has logged out. 'Lost Service' indicates there was a problem communicating with the RADIUS server or RADIUS accounting server. 'Lost Carrier' indicates that the server is no longer able to communicate with the subscriber. 'NAS Reboot' indicates that the server has encountered a communication problem with internal software modules. |
| Event-Time-stamp | This attribute is included in an Accounting Request message to record the time that this event occurred on the NAS, in seconds since Jan. 1, 1970 00:00 UTC. |
| Acct-Input-Octets | This attribute indicates how many octets have been received from the port over the course of this service being provided, and is sent in Accounting-Request records where the Acct-Status-Type is set to Stop or Interim. |
| Acct-Output-Octets | This attribute indicates how many octets have been sent to the port in the course of delivering this service, and is sent in Accounting-Request records where the Acct-Status-Type is set to Stop or Interim. |
| Acct-Input-Packets | This attribute indicates how many packets have been received from the port over the course of this service being provided to a Framed User, and is sent in Accounting-Request records where the Acct-Status-Type is set to Stop or Interim. |
| Acct-Output-Packets | This attribute indicates how many packets have been sent to the port in the course of delivering this service to a Framed User, and is sent in Accounting-Request records where the Acct-Status-Type is set to Stop or Interim. |
| Acct-Session-Time | This attribute indicates how many seconds the user has received service, and can only be present in Accounting-Request records where the Acct-Status-Type is set to Stop or Interim. |
| Acct-Delay-Time | This attribute indicates how many seconds the client has been trying to send the accounting message, and can be subtracted from the time of arrival on the server to find the approximate time of the event generating this Accounting Request message. (Network transit time is ignored.) It is sent in all Accounting Request message. |
| Class | This attribute is available to be sent by the server to the client in an Access Accept message, and is sent unmodified by the client to the accounting server as part of the Accounting Request message if accounting is supported. |
| VSA (Vendor Specific Attribute) | This Attribute is available to allow vendors to support their own extended Attributes not suitable for general usage. However, this attribute must not affect the operation of the RADIUS protocol. Servers not equipped to interpret the vendor-specific information sent by a client should ignore it (although it may be reported). Clients which do not receive |

TABLE 2-continued

RADIUS Accounting Record

| RADIUS Element | Description |
| --- | --- |
| | desired vendor-specific information should make an attempt to operate without it, although they may do so (and report they are doing so) in a degraded mode. |

The system and method of the present invention uses RADIUS accounting records to trigger GPRS CDR generation for those WLAN users that do not have GPRS account. The system of the present invention maps the parameters generated for a RADIUS Accounting-Request to a CDR. However, the CDR generation triggers remain the same. This new accounting system identifies the CDRs for the WLAN users by an IMSI which does not currently exist in the IETF domain. The accounting system of the present invention establishes a method by which a virtual IMSI is generated for the WLAN users based on certain rules. The virtual IMSI is then transferred to a WAIN Server and used in the CDR generation.

Figure 1:
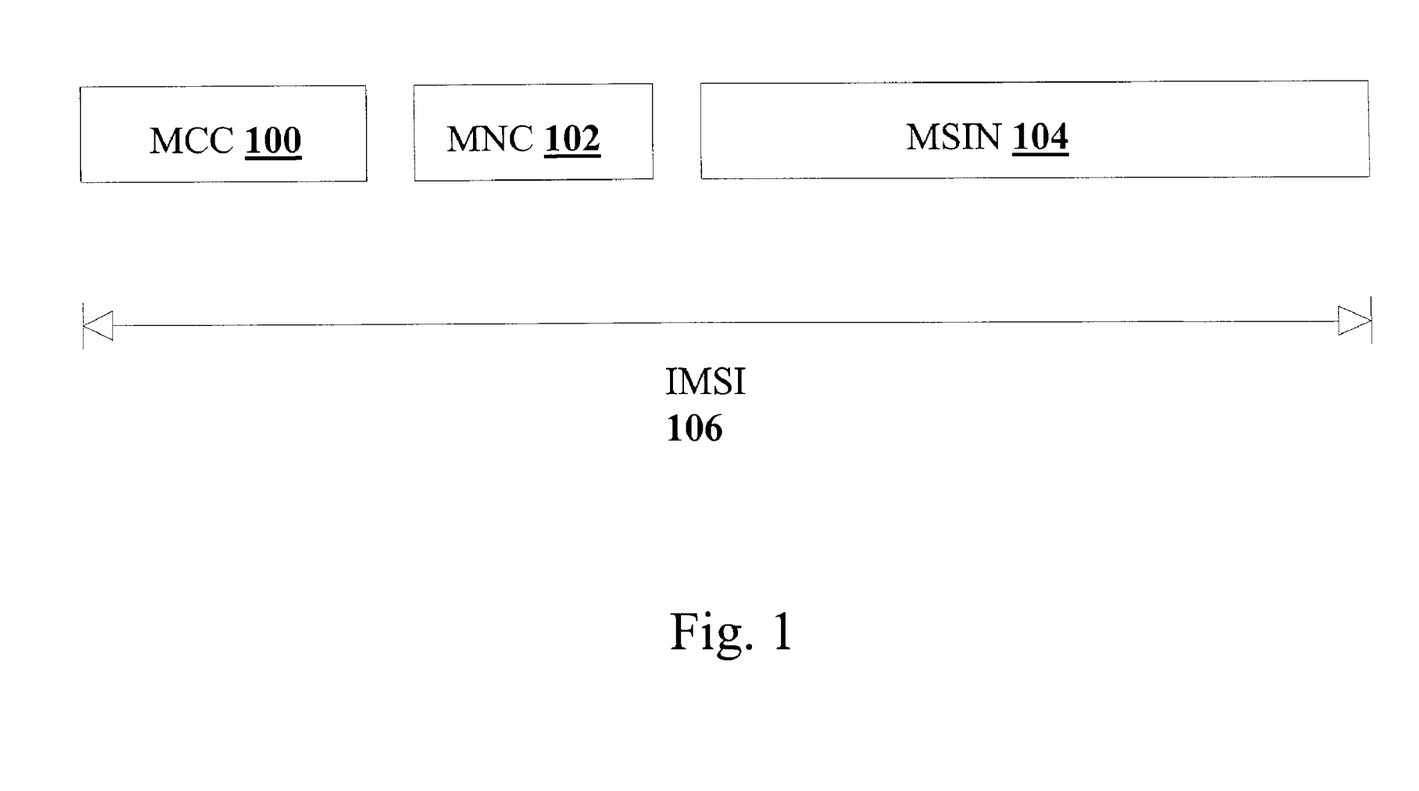
FIG. 1 is a diagram of an IMSI field.

Now referring to FIG. 1, the IMSI 100, as defined by the ETSI standard, contains three fields: the Mobile Network Code (MNC) 102; the Mobile Country Code (MCC) 104; and the Mobile Subscriber Identity Number (MSIN) 106. The MCC 104 is defined as 3 digits (Octets), the MNC 102 is defined as 2 or 3 digits (Octets), and the MSIN 106 is defined as 9 or 10 digits (Octets) for a total of 15 digits (Octets).

The new accounting system of the present invention maps the User-Name field in the RADIUS Account Record to the IMSI field in the CDR. However, the MSIN field in the IMSI, unlike the MNC and MCC fields, is assigned by the operator and is unique within its network. For each RADIUS user, a Virtual IMSI (V-IMSI) is defined to provide a one-to-one mapping to its User-Name. Although the V-IMSI is of the same format as the IMSI, it is used internally in the operator's network for identifying accounting records for WLAN users who do not have the GPRS subscription and IMSI assignment.

To identify the WLAN accounting and to avoid any conflict with a standard IMSI used in the accounting system, a special MSIN (V-MSIN) encoding is used for the V-IMSI. For example, the first 3 digits of the MSIN may be set to zero and the remaining digits used to identity individual WLAN users: V-MSIN=000XXXXXXX. Whatever mapping is used is known to both the RADIUS authentication server and the accounting system. However, other methods can also be used to generate a V-IMSI.

Figure 2:
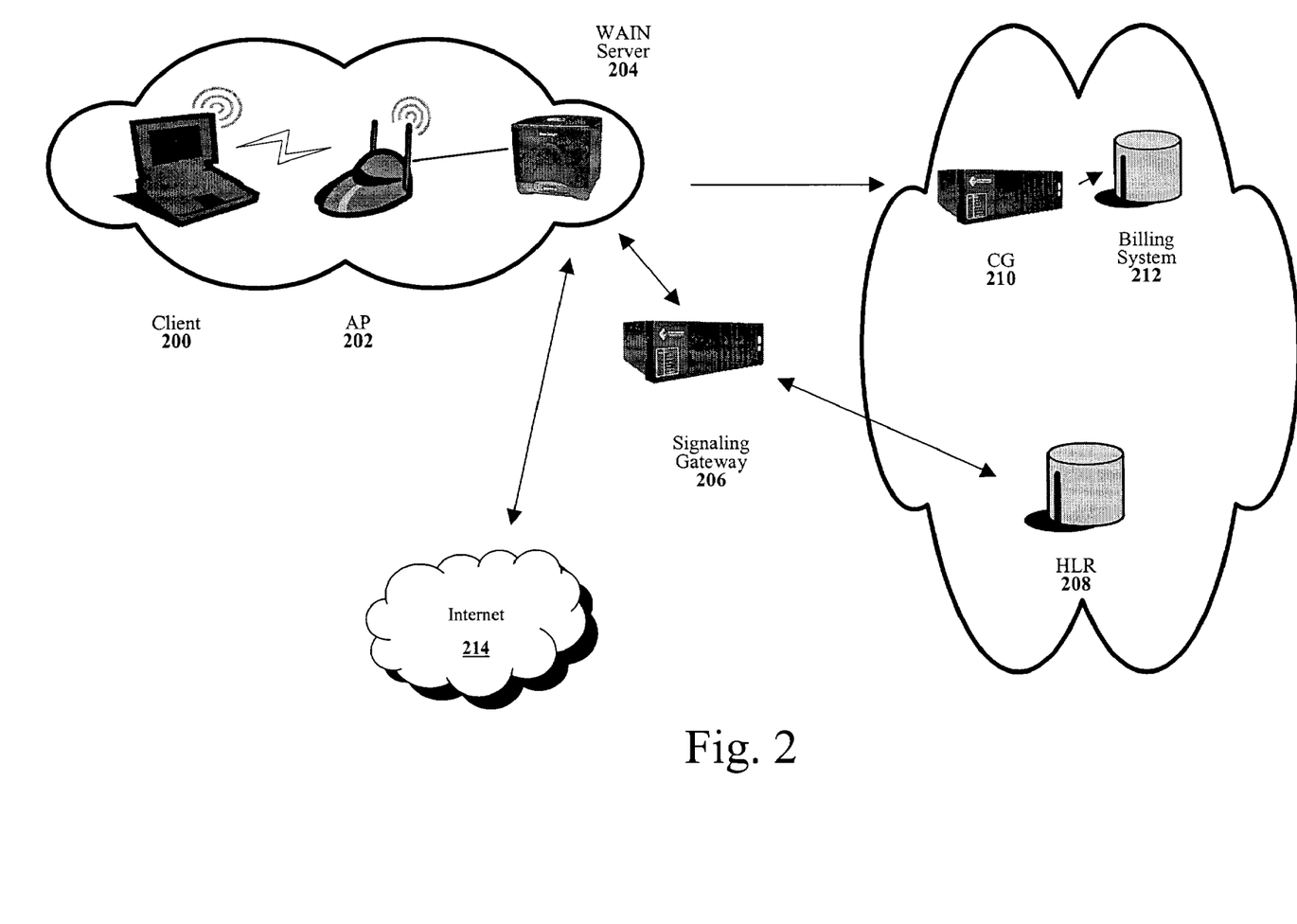
FIG. 2 is a diagram of a user logging into a server using a SIM card.

First referring to FIG. 2, a method of a SIM user logging into GPRS network will be described. The process a GPRS user usually follows is that the client 200 initiates communications with an access point 202 that is connected to a WAIN server 204. The WAIN server 204 then authenticates the client 200 by the client's SIM card through the signaling gateway 206 by sending an Authorization Info Request using the SIM card's IMSI. The Authorization Info Request is sent to the Home Location Register (HLR) 208 to check to see if the user is authorized to use the GPRS network. An Authorization Info Acknowledge message is sent back to the WAIN server 204 through the signaling gateway 206 if the user has authorization to use the GPRS network. CDR's are then generated at the WAIN server 204 with details of the user's service usage and sent to the CG 210 via a standard Ga interface and then to the Billing System 212. Each GPRS CDR is generated in standard ASN.1 format for the user 200 at the WAIN Server 204.

On the other hand, WLAN-only users do not have an IMSI and therefore can not use conventional GPRS CDRs. However, the present invention uses the RADIUS server to create a V-IMSI. The system then uses RADIUS messages to transport the V-IMSI from the RADIUS server to the WAIN server 204.

In the present embodiments, the WAIN Server 200 is used in two different configurations. One method uses the WAIN server as an Access Controller (AC) and the other method use the WAIN server as merely a RADIUS proxy and not an AC.

Figure 3:
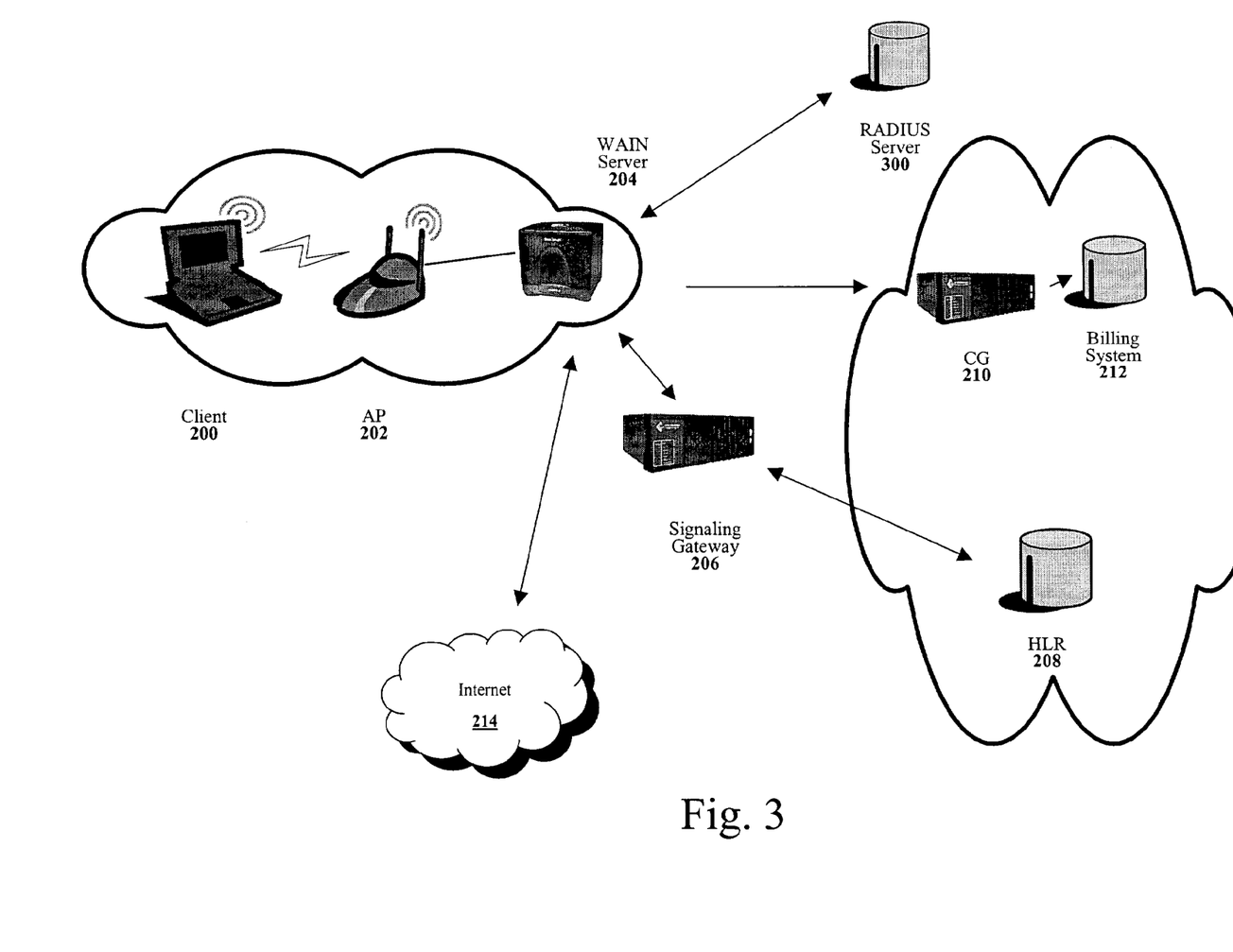
FIG. 3 is a diagram of a wireless local area network user logging into a server using a RADIUS user ID and password when the WAIN server is used as an AC.

Now turning to FIG. 3, the client 200 initiates communications with the access point connected to a WAIN server 204 as in the previous figure. However, the WAIN server 204 then communicates with a RADIUS server 300 to authenticate the WLAN-only user 200. Once the RADIUS user is successfully authenticated, the RADIUS Server 300 creates a V-IMSI for the WLAN-only user 200. The V-IMSI is then passed to the WAIN Server 204 in a Class attribute or a VSA of a RADIUS Access Accept message. The choice of the Class attribute or the VSA to be used for the V-IMSI is determined dynamically by the WAIN Server 204 in this embodiment.

As the user 200 logs out or the session is discontinued, the new RADIUS and GPRS ASN.1 formatted (GSM 12.15) combined accounting records are created into a CDR. In addition, the V-IMSI is inserted into every one of these CDRs. These CDRs are then collected by the existing GPRS Charging Gateway 210 and forwarded to the Billing System 212. The user information is then recovered from the V-IMSI in the CDRs and used for accounting purposes.

In addition, if the V-MSIN is chosen carefully, the V-IMSI can be later converted to a valid IMSI if the WLAN-only user subscribes to an integrated GPRS+WLAN service. The same IMSI can then be used for both GPRS and WLAN authentication and accounting.

In the present embodiment, the use of the Class attribute or the VSA for the V-IMSI is optional. However, the CDR generation based on the V-IMSI is dependent upon its presence in the Access Accept message from the RADIUS server 300. The WAIN Server 204 first checks for the presence of the VSA in the proper IMSI format. If the VSA is present in the proper format, then it is used; otherwise, the Class attribute is checked for the V-IMSI. If the V-IMSI is not present in the Access Accept message, the CDR is not generated. In this embodiment, if the coding of the V-IMSI received is in any other format besides the one specified below, the user will not be logged in.

Figure 4:
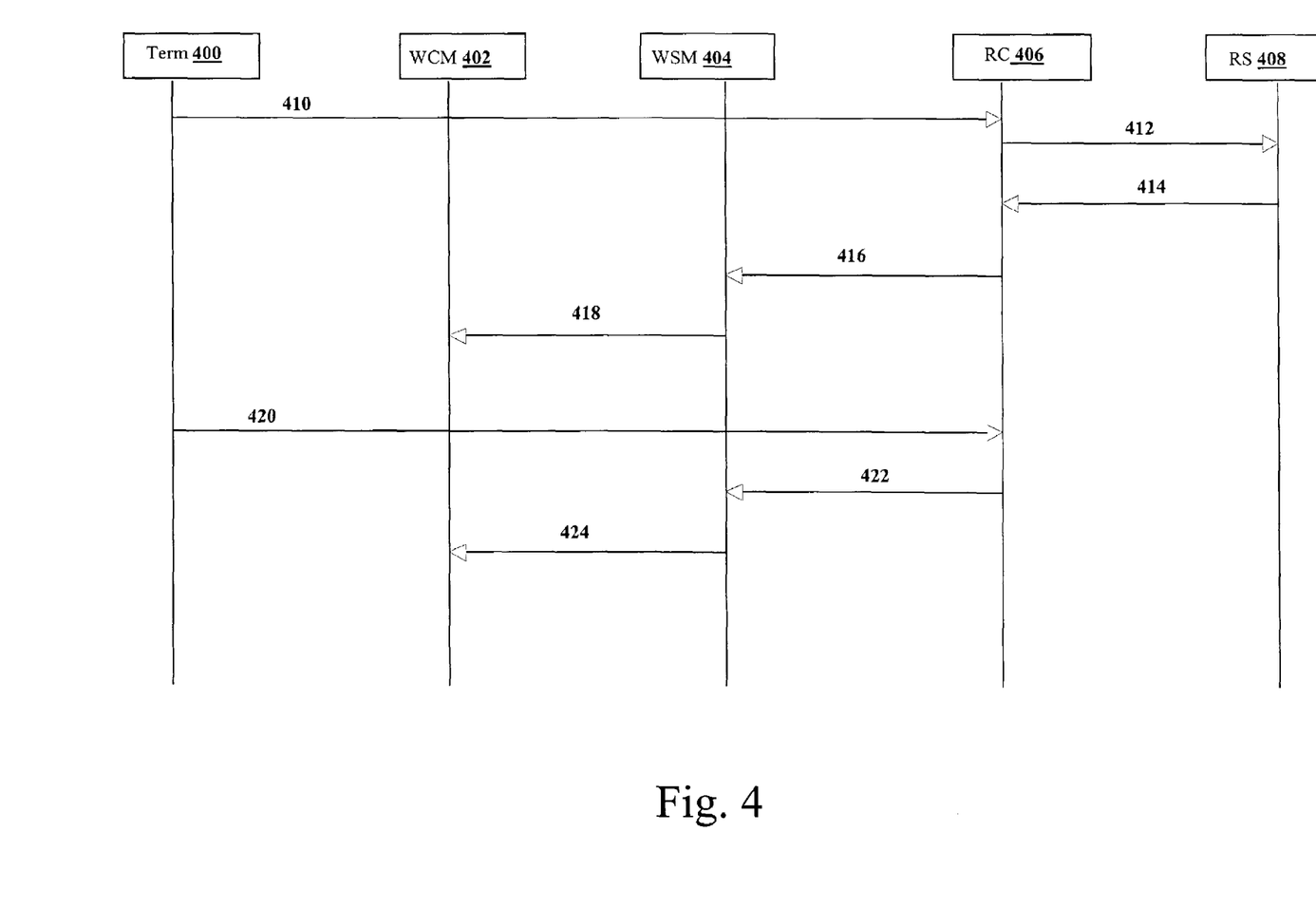
FIG. 4 is a message dialog of a wireless user logging into a RADIUS server.

Now turning to FIG. 4, a message exchange is described. The messages flow from a Client 400 to a WAIN Charging Manager (WCM) 402, a WAIN System Manager (WSM) 404 and a RADIUS Client (RC) 406 within a WAIN server (not shown) and to a RADIUS Server (RS) 408. In this embodiment, the interface between the WCM 402 and the WSM 404 is the same as it is for conventional RADIUS accounting records. However, the interface between the RC 406 and the WSM 404 is enhanced to carry the V-IMSI.

A summary of the VSA format is shown below. The fields are transmitted from left to right.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type   |  Length       |             Vendor-Id
+-+-+-+-+-+-+-+-+-+-+-+-+-+-+-+-+-+-+-+-+-+-+-+-+-+-+-+-+-+-+-+-+
     Vendor-Id (cont)        |  String...
+-+-+-+-+-+-+-+-+-+-+-+-+-+-+-+-+-+-+-+-+-+-+-+-+-+-+-+-+-
```

Type: 26 for Vendor-Specific.

Length: =21 (6 fixed bytes+15 ASCII Characters)

Vendor-Id: The high-order octet is 0 and the low-order 3 octets are the SMI Network Management Private Enterprise Code of the Vendor in network byte order, as defined in the Assigned Numbers 13448.

String: The String field is one or more octets. The actual format of the information is site or application specific, and a robust implementation should support the field as undistinguished octets. It should be encoded as a sequence of vendor type/vendor length/value fields, as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type   |  Length       |             Vendor-Id
+-+-+-+-+-+-+-+-+-+-+-+-+-+-+-+-+-+-+-+-+-+-+-+-+-+-+-+-+-+-+-+-+
     Vendor-Id (cont)        | Vendor type  |Vendor length|
+-+-+-+-+-+-+-+-+-+-+-+-+-+-+-+-+-+-+-+-+-+-+-+-+-+-+-+-+-+-+-+-+
|  Attribute-Specific...
+-+-+-+-+-+-+-+-+-+-+-+-+-+-
```

Vendor Type: 0

Vendor Length: 15 (the length of the "Attribute-Specific" field)

Attribute-Specific: The Attribute-Specific field is coded as an ASCII string of maximum size 15 representing the V-IMSI as following:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        MCC               |            MNC
+-+-+-+-+-+-+-+-+-+-+-+-+-+-+-+-+-+-+-+-+-+-+-+-+-+-+-+-+-+-+-+-
  MNC(Cont)      |           MSIN(10 octets)
```

The message exchange detailing a client logging into the GPRS network is now described. First, the Client 400 sends a Login-Request to the RC 406 as depicted by 410. The RC 406 then sends an Access-Request to the RS 408 as depicted by 412. The RS 408 responds with an Access-Accept with the Class or VSA attribute containing the V-IMSI value in ASCII format as depicted by 414. The Client 400 then Deactivates or Logs out as depicted by 420.

Although the WCM 402, the WSM 404 and the RC 406 are shown as separate modules in this embodiment, they can combined within a single entity. For example, the WAIN server, can implement each of the modules within the server itself.

Figure 5:
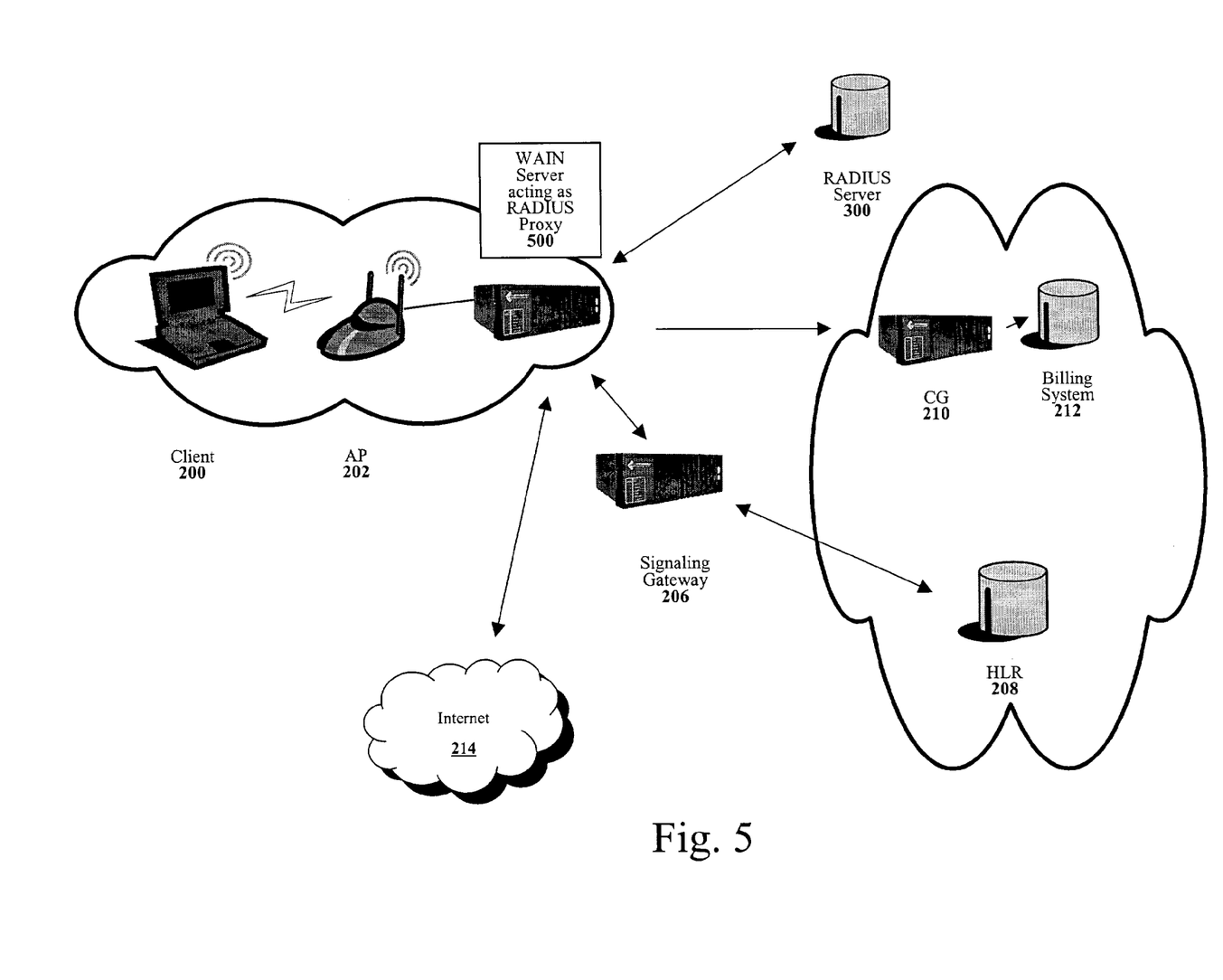
FIG. 5 is a diagram of a wireless local area network user logging into a server using a RADIUS user ID and password when the WAIN server is used as RADIUS proxy.

Now details of the second method wherein the WAIN Server 500 acts as a RADIUS proxy 500 and not as an AC is described in relation to FIG. 5. In this embodiment, the AP 202 is the AC (or an external Access Controller exists). Therefore, the WAIN Server 500 acts as a RADIUS proxy 500 for the RADIUS messages from the AP 202. All the messages shown in FIG. 3 between the WAIN Server 204 and the RADIUS Server 300 are exchanged between the RADIUS Server 300 and the AP 200 in this figure.

Once the RADIUS user 200 is successfully authenticated, the RADIUS Server 300 passes the V-IMSI to the AP 202 in a Class or a VSA attribute of the RADIUS Access Accept message. The AP 202 conveys the received V-IMSI to the WAIN Server 500 in the Class attribute or the VSA of accounting messages (e.g. Accounting Start, Accounting Stop and Interim Update). The choice of the Class attribute or the VSA to be used for V-IMSI is determined dynamically by the WAIN Server 500 in this embodiment also.

As the user logs out or the session is discontinued, the RADIUS and GPRS ASN.1 formatted (GSM 12.15) accounting records are created in CDRs for the RADIUS user 200. As in the previous embodiment, the V-IMSI for the RADIUS user 200 is inserted in every CDR. These CDRs are then collected by the existing GPRS Charging Gateway 210 and forwarded to the Billing System 212. The user information is then recovered from the V-IMSI in the CDRs and used for accounting purposes. Moreover, partial CDRs in this embodiment are tied to the Interim Update message. When the WAIN Server 500 receives an Interim Update message, it generates a partial CDR. This method also depends upon the support of the Class attribute or the VSA by the AC 202 and its ability to generate RADIUS accounting records for the WAIN server 500.

Moreover, although only single entities of the CG 210, HLR 208, and RADIUS Server 300, are shown in this embodiment, multiple entities for each node can be implemented and handled with the architecture of the present invention.

In addition, in order to convert the RADIUS messages into the GPRS CDR format to form a combined RADIUS/GPRS CDR, a parameter mapping is used by the present invention. In this embodiment, the CDR is generated by getting required parameters in real time and then writing them in the CDR. Some of the parameters are gathered from the RADIUS messages while others are generated internally by the WAIN Server or read from a configuration file. The RADIUS accounting record is also generated and exists for V-IMSI users. Table 3 below shows the RADIUS elements correlation with the CDR elements.

TABLE 3

Correlation of RADIUS elements to CDR dynamically from RADIUS Messages.

| RADIUS | | GPRS CDR | |
|---|---|---|---|
| Element | Description | Element | Description |
| Network Access Server (NAS)-IP-Address | This attribute indicates the identifying IP address of the server which is requesting authentication of the user. This attribute must be present if NAS-Identifier is not present. This attribute is configurable at the WAIN server. | N/A | N/A |
| NAS-Port-Type | This attribute indicates the type of the physical port of the NAS which is authenticating the user. It is only used in Access-Request packets. The value of the NAS-Port-Type is populated as 19 to represent 802.11. | N/A | N/A |

TABLE 3-continued

Correlation of RADIUS elements to CDR dynamically from RADIUS Messages.

| RADIUS | | GPRS CDR | |
|---|---|---|---|
| Element | Description | Element | Description |
| User-Name | This attribute indicates the name of the user to be authenticated. This is the user credential collected from the web login page. | Served IMSI | This fields contains the IMSI of the served party. The Client "served party" is used to describe the mobile subscriber involved in the transaction record-ed (e.g. the calling subscriber in case of a mobile initiated PDP context). |
| Framed-IP-Address | This attribute indicates the IP address assigned to the user. | Served PDP Address | This field contains the PDP address of the served IMSI. This is a network layer address (e.g. of type IP version 4, or IP version 6). |
| Acct-Session-ID | This attribute is a unique Accounting ID to make it easy to match start and stop records in a log file. The start, stop, and interim records for a given session have the same Acct-Session-Id. An Accounting-Request message has an Acct-Session-Id. This attribute is generated by the WAIN server when it sends an Accounting Request (Acct-Status-Type=Start) message. | Charging ID | This field is a charging identifier which can be used together with GGSN address to identify all records produced in the SGSN(s) and the GGSN involved in a single PDP context. Charging ID is generated by the GGSN at PDP context activation and transferred to a context requesting SGSN. At inter-SGSN routing area updates, the charging ID is transferred to the new SGSN as part of each active PDP context. |
| Acct-Status-Type | This attribute indicates whether this Accounting Request marks the beginning of the user service (Start), interim (Interim), or the end (Stop). The WAIN server supports the following values: Start; Stop; and Interim. | N/A | N/A |
| Acct-Terminate-Cause | This attribute indicates how the session was terminated, and can only be present in Accounting-Request records where the Acct-Status-Type is set to Stop. The WAIN server supports the following values: Session Timeout (5); User Request (1); Lost Service (3); Lost Carrier (2); and NAS Reboot (11). 'Session Timeout' indicates that the expiry of Session-Timeout values received in Accounting Request (Acct-Status-Type=Stop). 'User Request' indicates the user has logged out. 'Lost Service' indicates there was a problem communicating with the RADIUS server or RADIUS accounting server. 'Lost Carrier' indicates that the server is no longer able to communicate with the subscriber. 'NAS Reboot' indicates that the server has encountered a communication problem with internal software modules. | Cause for Record Closing/ Diagnostic | This field contains a reason for the release of the CDR including the following: normal release - PDP context release or GPRS detach; partial record generation - data volume limit, time (duration) limit, SGSN change of maximum number of changes in charging conditions; abnormal termination (PDP or MM context); and management intervention (request due to O&M reasons). A more detailed reason may be found in the diagnostics field. |
| Event-Time-stamp | This attribute is included in an Accounting Request message to record the time that this event occurred on the NAS, in seconds since Jan. 1, 1970 00:00 UTC. | Record Opening Time | This field contains the time stamp when the record is opened (see GSM 12.05 for exact format). |
| Acct-Input-Octets | This attribute indicates how many octets have been received from the port over the course of this service being provided, and is sent in Accounting-Request records where the Acct-Status-Type is set to Stop or Interim. | List of Traffic Data Volumes: Data Volume Downlink | This list includes one or more containers, which each include the following fields: Data Volume Uplink, Data Volume Downlink, Change Condition and Time Stamp. Data Volume includes the number of octets transmitted during the use of packet data services. |
| Acct-Output-Octets | This attribute indicates how many octets have been sent to the port in the course of delivering this service, and is sent in Accounting-Request records where the Acct-Status-Type is set to Stop or Interim. | List of Traffic Data Volumes: Data Volume Uplink | This list includes one or more containers, which each include the following fields: Data Volume Uplink, Data Volume Downlink, Change Condition and Time Stamp. Data Volume includes the number of octets transmitted during the use of packet data services. |
| Acct-Input-Packets | This attribute indicates how many packets have been received from the port over the course of this service being provided to a Framed User, and is sent in Accounting-Request records where the Acct-Status-Type is set to Stop or Interim. | N/A | N/A |
| Acct-Output-Packets | This attribute indicates how many packets have been sent to the port in the course of delivering this service to a Framed User, and is sent in Accounting-Request records where the Acct-Status-Type is set to Stop or Interim. | N/A | N/A |
| Acct-Session-Time | This attribute indicates how many seconds the user has received service | Duration | This field contains the relevant duration in seconds for PDP |

TABLE 3-continued

Correlation of RADIUS elements to CDR dynamically from RADIUS Messages.

| RADIUS | | GPRS CDR | |
|---|---|---|---|
| Element | Description | Element | Description |
| | for, and can only be present in Accounting-Request records where the Acct-Status-Type is set to Stop or Interim. | | contexts (S-CDR, G-CDR). For partial records, this is the duration of the individual partial record and not the cumulative duration. |
| Acct-Delay-Time | This attribute indicates how many seconds the client has been trying to send the accounting message, and can be subtracted from the time of arrival on the server to find the approximate time of the event generating this Accounting Request message. (Network transit time is ignored.) It is sent in all Accounting Request message. | N/A | N/A |
| VSA | This Attribute is available to allow vendors to support their own extended Attributes not suitable for general usage. However, this attribute must not affect the operation of the RADIUS protocol. Servers not equipped to interpret the vendor-specific information sent by a client ignore it (although it may be reported). Clients which do not receive desired vendor-specific information should make an attempt to operate without it, although they may do so (and report they are doing so) in a degraded mode. | N/A | N/A |
| Class | This attribute is available to be sent by the server to the client in an Access Accept message, and SHOULD be sent unmodified by the client to the accounting server as part of the Accounting Request message if accounting is supported. | N/A | N/A |

The parameters that the WAIN Server generates internally or read from the configuration file are listed below in Table 4 along with the source information.

TABLE 4

Source of the CDR elements that cannot be derived from RADIUS messages

| Field | Presence<br>M = Mandatory<br>C = Conditional<br>O = Optional | Description | Source |
|---|---|---|---|
| Record Type | M (S-CDR/G-CDR) | The field identifies the type of the record e.g. S-CDR, G-CDR, M-CDR, S-SMO-CDR and S-SMT-CDR. | WAIN Charging Manager |
| GGSN Address | M (S-CDR/G-CDR) | The IP address of the GGSN used. | |
| SGSN Address | M (S-CDR/G-CDR) | The IP address of the SGSN. | |
| Routing Area | | Routing Area at the time of the record creation. | Network Management |
| Local Area Code | O (S-CDR) | Location area code at the time of the record creation. | Network Management |
| Cell Identity | O (S-CDR) | Cell ID at the time of the record creation. | Network Management |
| GGSN Address Used | M (S-CDR) | The IP address of the GGSN currently used. The GGSN address is always the same for an activated PDP. | WAIN.CFG |
| Access Point NameNI | M (S-CDR/G-CDR) | This field contains the logical APN used to determine the actual connected access point. APN comprises of mandatory network identifier and optional operator identifier (This field is the network identifier). APN can also be a wildcard, in which case SGSN selects the access point address. See GSM 09.60 and GSM 03.60 for more information about APN format and access point decision rules. The APN is information from the MS or SGSN, that may be used by the GGSN to differentiate between accesses to different external packet data networks using the same PDP Type. | Network Management |
| APN Selection Mode | O (S-CDR/G-CDR) | This field indicates how the SGSN selected the APN to be used. The values and their meaning are as specified in GSM 09.60 clause 7.9 'Information elements'. | Hard Coded as "MS or Network Provided Subscription Verified" |
| PDP Type | M (S-CDR/G-CDR) | This field defines the PDP type, e.g. X.25, IP, PPP, or IHOSS:OSP (see GSM 09.60 for exact format). | Hard Coded as "IP" |
| Dynamic Address Flag | C (G-CDR) | This field indicates that PDP address has been dynamically allocated for that particular PDP context. Field is missing if address is static (e.g. part of PDP context subscription). Dynamic address allocation might be relevant for charging (e.g. the duration of PDP context as one resource offered and possibly owned by network operator). | Hard Coded as "True" |
| Node ID | O (S-CDR/G-CDR) | This field contains an optional operator configurable identifier string for the node which generated the CDR. | Network Management |

TABLE 4-continued

Source of the CDR elements that cannot be derived from RADIUS messages

| Field | Presence M = Mandatory C = Conditional O = Optional | Description | Source |
|---|---|---|---|
| Local Record Sequence Number | O (S-CDR/ G-CDR) | This field includes a unique record number created by this node. The number is allocated sequentially including all CDR types. The number is unique within one node, which is identified either by field Node ID or by record dependent node address (SGSN address, GGSN address, Recording Entity). The field can be used to identify missing records in a post processing system. | WAIN Charging Manager |
| Access Point Name OI | O (S-CDR) | This field contains the logical APN used to determine the actual connected access point. APN comprises of mandatory network identifier and optional operator identifier (this field is the operator identifier). APN can also be a wildcard, in which case SGSN selects the access point address. See GSM 09.60 and GSM 03.60 for more information about APN format and access point decision rules. The APN is information from the MS or SGSN, that may be used by the GGSN to differentiate between accesses to different external packet data networks using the same PDP Type. | Network Management |
| Record Sequence Number | C (S-CDR/ G-CDR) | This field contains a running sequence number employed to link the partial records generated in the SGSN/GGSN for a particular PDP context (characterized with same the Charging ID and GGSN address pair). In the S-CDR, the sequence number is always started from one after inter-SGSN routing area update, see field "SGSN change". The Record Sequence Number is missing if the record is the only one produced in the SGSN/GGSN for the PDP context (e.g. inter-SGSN routing area update can result to two S-CDRs without sequence number and field "SGSN update" present in the second record). | WAIN Charging Manager |

Using both tables 3 and 4, the system of the present invention creates the new combined RADIUS/GPRS CDRs for the WLAN-only users that conform with the GPRS accounting format. Thus, the present invention creates a unified accounting system for both WLAN-only users as well as GPRS users. In addition, the system of the present invention provides a method for WLAN-only users to later convert their V-IMSI into a permanent IMSI for GPRS use.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A system for providing unified accounting for a hybrid wireless network, the system comprising:
    a mobile client;
    an access point connected to the mobile client;
    a wireless integrated node connected to the access point;
    a RADIUS server connected the wireless integrated node, wherein the RADIUS server authenticates the mobile client and also provides an identity number for the mobile client;
    a charging gateway connected to the wireless integrated node;
    a billing system connected to the charging gateway, wherein the billing system provides a bill for usage of the wireless network by the mobile client and wherein the bill utilizes the mobile client's identity number.

2. The system of claim 1 further including a signaling gateway and a home location register for authenticating the mobile client.

3. The system of claim 1 wherein the identity number is an International Mobile Subscriber Identity (IMSI) number.

4. The system of claim 3 wherein the IMSI is a temporary number only.

5. The system of claim 3 wherein the IMSI is transformed to a permanent number for use by the mobile client.

6. The system of claim 1 further including a call detail record utilizing the identity number to produce the bill for the mobile client.

7. The system of claim 1 further including a means to combine RADIUS elements with a call detail record.

8. A method of producing unified bill for a hybrid wireless network, the method comprising:
    authenticating a mobile client through an access point and a wireless integrated node by a RADIUS server;
    providing an identity number to the mobile client upon authentication;
    accessing the network to utilize resources by the mobile client;
    producing billing records utilizing the identity number for the resources utilized by the mobile client, wherein the billing records are stored in a billing system for non-RADIUS mobile clients.

9. The method of claim 8 further including authenticating a second mobile client through a signaling gateway and a home location register.

10. The method of claim 8 wherein the identity number is an International Mobile Subscriber Identity (IMSI) number.

11. The method of claim 8 wherein the IMSI is a temporary number only.

12. The method of claim 8 wherein the IMSI is transformed to a permanent number for use by the mobile client.

13. The method of claim 8 wherein the billing record is a call detail record.

14. The method of claim 8 further including combining RADIUS elements with a call detail record.

15. A method of producing unified bill for a hybrid wireless network, wherein the network includes European Telecommunications Standard Institute (ETSI) elements and Internet Engineering Task Force (IETF) elements, the method comprising:
    authenticating a mobile client through an access point and a wireless integrated node by a RADIUS server;
    providing an International Mobile Subscriber Identity (IMSI) number to the mobile client upon authentication;

accessing the network to utilize resources by the mobile client;

producing call detail records utilizing the IMSI number for the resources utilized by the mobile client, wherein the billing records are stored in a ETSI billing system.

16. The method of claim 15 further including authenticating a second mobile client through a signaling gateway and a home location register.

17. The method of claim 15 wherein the IMSI is a temporary number only.

18. The method of claim 15 wherein the IMSI is transformed to a permanent number for use by the mobile client.

19. The method of claim 15 further including combining RADIUS elements with the call detail record.

* * * * *